United States Patent

[11] 3,596,104

| [72] | Inventor | James Dale Macomber<br>Baton Rouge, La. |
|------|----------|--------|
| [21] | Appl No. | 798,078 |
| [22] | Filed | Feb. 10, 1969 |
| [45] | Patented | July 27, 1971 |
| [73] | Assignee | The United States of America as represented by the Secretary of Health, Education and Welfare |

[54] METHOD AND APPARATUS FOR ANALYZING TRAVELING LIGHT WAVES
2 Claims, 5 Drawing Figs.

[52] U.S. Cl. .................................................. 250/227,
250/233, 350/96 WG, 350/172, 350/174, 356/225
[51] Int. Cl. ........................................................ G02b 5/14,
H01j 39/12
[50] Field of Search ............................................ 250/216,
227, 233; 350/96, 96 WG, 169, 171, 172, 174;
356/225

[56] References Cited
UNITED STATES PATENTS

| 3,312,140 | 4/1967 | Dokoupil | 250/219 WD UX |
| 3,334,538 | 8/1967 | Steinhausen | 350/96 X |
| 3,325,594 | 6/1967 | Goldhammer et al. | 250/219 WD UX |
| 3,403,261 | 9/1968 | Bowers et al. | 350/172 X |
| 3,493,288 | 2/1970 | Kaufman et al. | 350/96 WG |

Primary Examiner—James W. Lawrence
Assistant Examiner—Charles M. Leedom
Attorney—Holman and Stern ABSTRACT: A method and apparatus for analyzing traveling light waves is disclosed, the method and apparatus serving to decrease the effective rise time of information-containing modulations on a short duration light pulse whereby detection of the modulations is enhanced. The instant invention serves to initially sample the intensity of the light pulse at a plurality of different points along the spatially distributed waveform thereof. Separate signals are generated representative of each sampled intensity and each separate signal is stored for a respectively different time duration. The stored signals are then sequentially monitored by an electronic detection device. In effect, then, the instant invention comprises a real-time light sampler utilizing spatial chopping techniques so as to effectively increase the temporal resolution and decrease the effective rise time of modulations on the light pulse such that very rapid (e.g., nonlinear) optical phenomenon can be observed.

INVENTOR
JAMES D. MACOMBER

INVENTOR
JAMES D. MACOMBER

BY Jacobi and Davidson
ATTORNEYS

METHOD AND APPARATUS FOR ANALYZING TRAVELING LIGHT WAVES

BACKGROUND OF THE INVENTION

This invention generally relates to monitoring and detection systems and techniques and particularly concerns a method and apparatus for analyzing traveling light waves.

Electronic detection systems are in existence today for detecting and monitoring a very short light pulse such as might be produced by a Q-switched laser. Ideally, such electronic detection systems are designed to accurately reproduce the waveform of the incident light pulse or filament without any appreciable distortion such that information-carrying intensity modulations thereof can be resolved. Such prior art systems generally structurally comprise a photodetector into which the light pulse directly impinges, the output of the photodetector being coupled with a cathode-ray oscilloscope.

In theory, such prior art systems are suitable for their purpose. Yet, when one takes into consideration certain practical limitations on the equipment available for use in such electronic detection systems, the considerable drawbacks of this prior art system and approach can be appreciated. Perhaps the greatest drawback to this type of system resides in the finite, though extremely short, rise times of the photodetector elements and associated oscilloscope equipment utilized. It is not unusual that such prior art systems would have overall rise times of about 0.5 nanoseconds and, of course, this creates an inherent limit on the amount of information of the light pulse that such a system can digest in a given period of time. Any variation in intensity of the light pulse that is to be monitored that occurs at a faster rate than the inherent rise time of the detection equipment would go unmonitored or, at best, would be greatly distorted.

SUMMARY OF THE INVENTION

Thus, there exists a need in this art for both an improved method as well as apparatus for analyzing traveling light waves such as produced by a very short light pulse. It is a primary object of the instant invention to satisfy this need. Other, more specific yet equally important, objects of the instant invention are as follows:

to provide an improved method and apparatus for analyzing traveling light waves which requires little additional expenditure over and above the cost of a basic electronic detection system itself;

to provide an improved method and apparatus for analyzing traveling light waves, which method and apparatus is contemplated for accessory use with standard electronic detection systems;

to provide an improved method and apparatus for analyzing traveling light waves which accurately and without distortion monitors and detects short duration light pulses such as may be produced by a laser;

to provide an improved method and apparatus for analyzing traveling light waves which eliminates or at least greatly reduces the limiting effect of the various rise times within the electronic detection system;

to provide an improved method and apparatus for analyzing traveling light waves which effectively increases the rise time of modulations on a short duration light pulse so as to enhance detection thereof; and, to provide an improved method and apparatus for analyzing traveling light waves which can be effected and produced with a minimum of relatively uncomplicated additional equipment.

These objects are implemented by the instant invention which proceeds from the fact and principle that a generated light pulse will be distributed in space as well as in time and conceptually can be thought of as comprising and utilizing real-time light sampling techniques and spatial chopping so as to, in effect, increase the temporal resolution and decrease the effective rise time of the light pulse such that very rapid nonlinear optical phenomenon can be observed.

The instant invention serves to sample the intensity of the generated light pulse at a plurality of different points along the spatially distributed waveform thereof, a separate optical signal representative of each sampled intensity being produced. Each of the separate optical signals are stored for respectively different time durations and subsequently are sequentially monitored at a rate well within the rise time capabilities of the electronic detection system with which the instant invention is associated.

BRIEF DESCRIPTION OF THE DRAWINGS

Objects other than those set forth above as well as additional features and advantages of the instant invention will become apparent from the following detailed description of the inventive technique as well as a preferred embodiment of the inventive apparatus, such description referring to the appended drawings wherein.

DESCRIPTION OF THE PREFERRED INVENTIVE EMBODIMENTS

Figure 1:
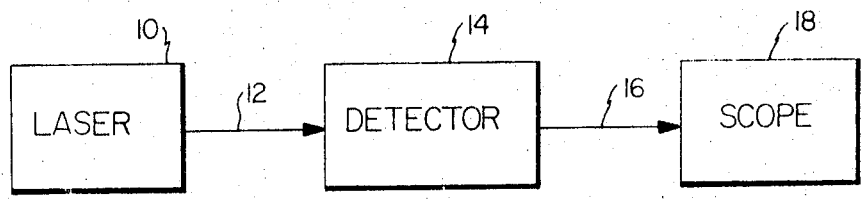
FIG. 1 schematically depicts a typical prior art electronic detection system for short duration light pulses.

Referring now to the drawings, and particularly to FIG. 1 thereof, the general arrangement of typical prior art electronic detection systems for very short light pulses is illustrated. The light pulses are such as might be produced by a Q-switched solid-state laser designated 10. The light pulse generated by laser 10 travels along path 12 to a detector unit or element designated 14. Detector element 14 serves to detect the optical intensity variations of the light pulse waveform and to convert, in an accurate manner, such intensity variations into electrical signals. These electrical signals pass from detector element 14 along conductor 16, for example, whereupon these electrical signals drive a distributed-deflection CRT oscilloscope designated 18. The tracing of oscilloscope 18 is normally then photographed by any of a variety of well-known scope cameras and a permanent record is thus derived of the intensity variations of the laser generated light pulse.

In theory, at least, an electronic detection system such as above described should be capable of accurately detecting and reproducing all intensity modulations of the generated light pulse. In practice, however, this capability is diminished due to the inherent limitations of the system components particularly with respect to their inherent "rise times," i.e., the amount of time it takes the element to respond to a change in incoming signal intensity. Exemplary prior art equipment utilized in the electronic detection system comprises a photodetector such as an ITT biplanar photodiode as the detector element 14 and an oscilloscope such as the Tektronix 519 as the scope 18. Both the photodetector 14 and the scope 18 have exemplary "rise times" of 0.35 nanoseconds giving an overall system rise time of $$\sqrt{(0.35)^2+(0.35)^2} \approx 0.5 \text{ nanoseconds.}$$

Any intensity variation of the incident light pulse having a rise time faster than 0.5 nanoseconds thus would be greatly distorted by this typical prior art detection system. Accordingly, such prior art detection systems by no means are capable of "digesting" all the information that might be contained on the incident light pulse.

Figure 3:
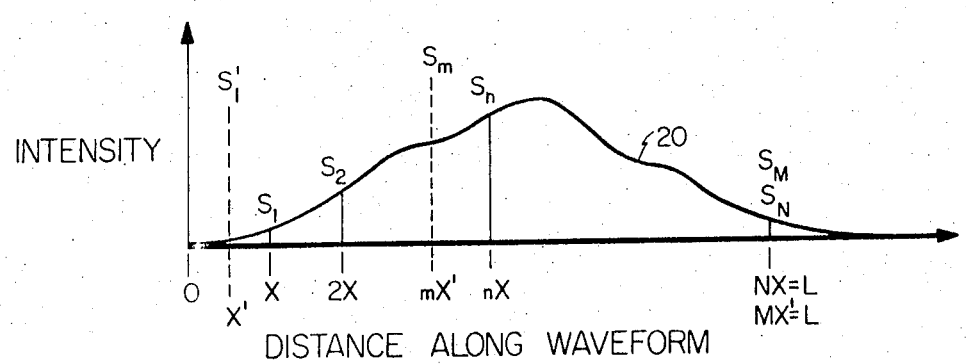
FIG. 3 diagrammatically depicts the waveform curve of a typical short duration light pulse, such waveform being divided into segments in accordance with the instant inventive method.

As an aid in visualizing this inherent detection problem of the prior art, attention is directed to FIG. 3 of the appended drawings. Initially, it is assumed that laser 10 has generated a light pulse or filament in the direction 12 towards the detector element 14. If the overall time duration of the light pulse is $\tau$ and the velocity of the light pulse is $c$, the total length $L$ of the light filament 20 will be given by:

$$L = (c/\tau) \quad (1).$$

Light filament 20 can further be conceived as being divided into N individual segments $x$. The light intensity of the filament 20 adjacent each of the segments $x$ can be designated $S_n$, $x \leq n \leq N$.

Photoelectronic detector 14 can, as described above, be characterized by the amount of time it requires to respond to a change in signal intensity of the light filament 20, this time duration being the "rise time" T of the detector. If $(\tau/N) > T$, then the operation of the detector can be described in terms of the intensities $S_n$ of each individual filament segment. Detector 14 thus can be deemed to receive the light signal or filament 20 in the form of "bits of information" represented by the individual light intensities $S_n$. Detector 14 receives an information bit every T seconds and cannot process or digest the "information" at any faster rate. Thus, any fluctuations of light intensity which might occur in a time less than T cannot be detected by detector element 14. No finer details of the intensity variation of the light pulse than as exist at each point $S_n$ with the values assumed above can be monitored by detector 14.

So as to avoid this inherent detection problem, real-time light sampling techniques and spatial chopping are utilized by the instant invention to effectively increase the temporal resolution and decrease the effective rise-time of the light pulse such that very rapid (e.g., nonlinear) optical phenomenon occurring at intervals $(\tau/N) < T$ can be observed by the detector.

Figure 2:
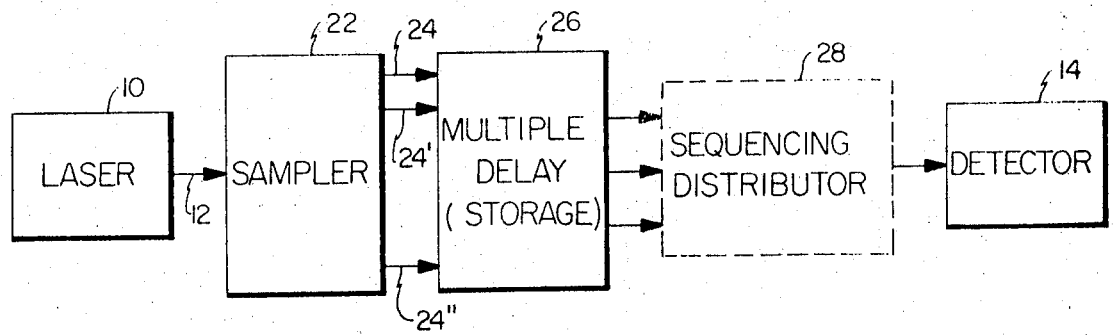
FIG. 2 schematically illustrates the operational principles of the instant invention as well as a general, overall structural embodiment thereof.

Referring now to FIG. 2, the overall structural configuration of the instant invention is disclosed. Critical to the instant invention is the provision of a sampling means or sampler 22 and a multiple delay or storage means 26, or functional equivalents thereof disposed in the path 12 of the light filament 20 between the generator means or laser 10 and the detector element 14. Sampler 22, in effect, serves to sample the intensity of the incident light pulse or filament 20 at a plurality of different points along the spatially distributed waveform thereof as depicted in FIG. 3. Sampling means 22 generates a separate optical signal at different, spatial locations 24, 24'... 24'', each separate signal being representative of the respective sampled intensity of the light pulse or filament 20. Sampling means 22 can be either of the dynamic variety or of the static variety as will be discussed in more detail hereinbelow. If sampler 22 is "dynamic," then only a single moving deflector may be used which serves to successively deflect the incident photons comprising the traveling light wave or filament 20 into respectively different spatial directions. If a "static" sampler is utilized, such sampler could comprise a series of stationary deflectors spaced at predetermined physical distances along the length of the incident light filament 20 and would operate so as to simultaneously deflect the photons of different portions or segments of the filament towards different spatial directions and locations.

Regardless of whether a "dynamic" or "static" sampler is utilized, the effect is the same. Referring again to FIG. 3, consider the light filament 20 having a length L to be divided into M segments, each segment being of length $x'$, as depicted by the dotted lines. Sampling means 22 would thus produce M bursts of light, each light burst or optical signal being directed along respective ones of the paths 24, 24'... 24'' towards different spatial locations, each light burst or optical signal being proportional to the intensities of the light filament 20 occurring at the joining points of the segments $S_m$, $0 \leq m \leq M$. Now, if $x' < x$ and $M > N$, then potentially more information concerning the light pulse 20 is made available than was available if sampling means 22 were removed and detector element 14 placed directly in the path 12 of the incident light pulse. To realize this potential, however, the M bits of information must be stored and sequentially fed into detector 14 at a rate within the rise time capabilities T of the detector.

A multiple delay or storage means 26 (FIG. 2) is thus provided for storing each individual light burst, signal or bit $S_m$, for a different amount of time. For example, the first burst of light or signal from sampling means 22 which might be generated along the path 24 would be stored for $t_o$ seconds, the second burst of light generated by sampling means 22 along path 24' would be stored to $t_1$ seconds, and so forth, such that $t_m - t_{m+1} = \Delta t$, $1 \leq m \leq M$. If $\Delta t > T$, then detector 14 will, in principle, be able to "digest" one bit of information before the next bit is received. The signals stored by the multiple delay means 26 are applied to the detector element 14 in a sequential fashion, this sequence being inherent in the case of "dynamic" sampling, or being specifically provided through a sequencing distributor 28 in the case of "static" sampling, as will be discussed below. In either case, detector 14 which previously could only process N bits of information concerning light pulse or filament 20, can now process $M > N$ bits of information of the same light pulse by virtue of this novel technique.

The instant invention, from a structural standpoint, is contemplated as comprising a true "accessory" device consisting of the sampling means 22 and the multiple delay means 26, this accessory device being adapted to be placed between the light generating means or laser 10 and the detector unit or element 14 of prior art electronic detection systems for short light pulses. In theory, the capabilities of such electronic detection systems utilizing the inventive accessory device can be increased without limit and, in practice, utilizing generally available equipment, a two or threefold increase over prior art capabilities is indicated.

Figure 4:
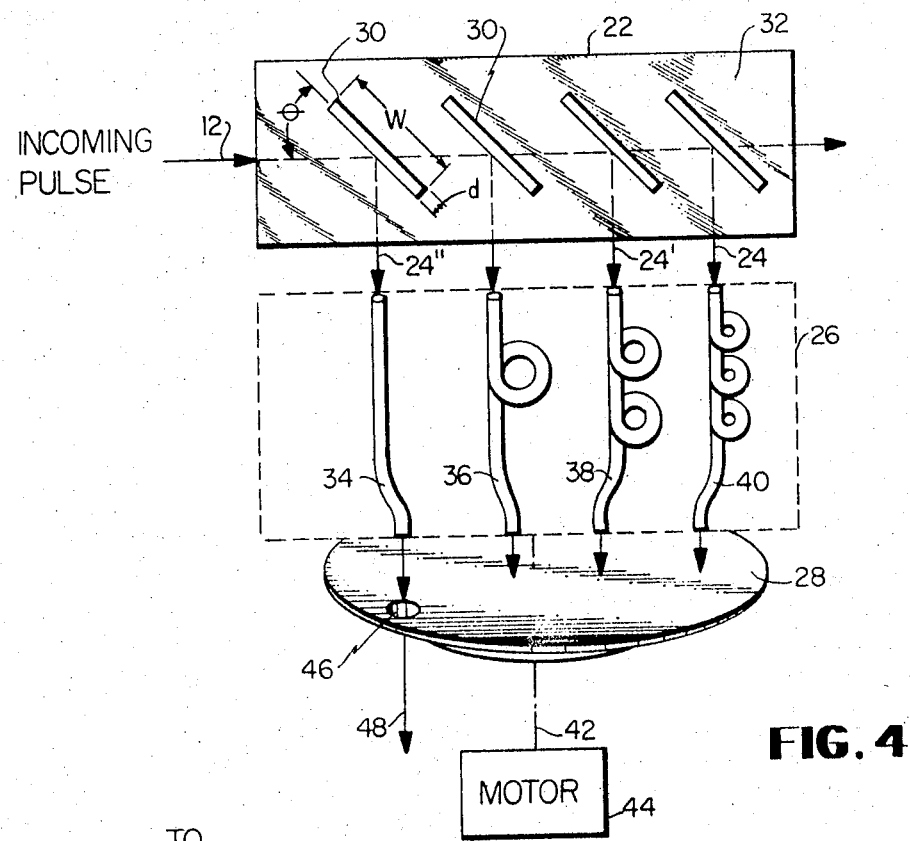
FIG. 4 diagrammatically depicts one form of apparatus suitable for carrying out the instant invention utilizing static sampling techniques.

Referring now to FIG. 4, a preferred structural embodiment of the instant inventive "accessory" device is depicted, this embodiment making use of a so-called "static" sampling means 22. The static sampler 22 is contemplated to comprise a series of transparent flat plates 30 which are spaced from one another at regular intervals $x'$ along the length L of the light filament 20. Each of the plates 30 has a thickness $d$ less than $x'$. Plates 30 are preferably disposed at an angle $\theta$ to the direction 12 of the incident light pulse 20. The width W of the plates 30 preferably is such that plates 30 do not serve to sample more than one segment of the incident pulse.

Since each reflection produced by the transparent flat plates 30 serves to deplete the power in the incoming light pulse 12, the angle $\theta$ is preferably adjusted to be near Brewster's angle and the transparent material 32 surrounding the plates 30 is constrained to have an index of refraction near that of the plates 30. Each of the transparent plates 30, due to their physical disposition, serve to sample the actual intensity of the light pulse at different points along the spatially distributed waveform thereof. Only four such plates 30 have been illustrated to preserve clarity, yet any desired number of plates can comprise the constructed series. Each transparent plate 30 reflects a portion of the light filament 20 towards different spatial locations 24, 24'... 24'', the signal reflected from each plate 30 being representative of the actual intensity $S_m$ of the light filament at a point along its distributed waveform corresponding to the location of a given transparent flat plate 30.

The light bursts or signals thus generated by the static sampling means 22 are directed toward different apertures of the multiple storage or delay means 26. Storage means 26, as illustrated in FIG. 4, preferably comprises a plurality of transparent fibers 34, 36, 38 and 40, utilized as light pipes, one transparent fiber being provided for each of the transparent flat plates 30 of the sampling means 22. As stated above, the function of the storage means 26 is to delay or store each of the individual light bursts produced by the sampler 22 for a different length of time. Thus, fiber 34 might have a length $a$, fiber 36 would then have a length $2a$, fiber 38 would then have a length $3a$, fiber 40 would then have a length $4a$, and so forth. Each light fiber or element of the multiple delay means 26 would serve to radiate optical signals in a continuous manner since sampler 22 is of the "static" variety. As a flash proportional to the intensity of light filament 20 at point $S_m$ is emerging from the $m^{th}$ light fiber, which fiber could be fiber 40 in the drawing, for example, a flash of light proportional to the intensity of the light filament at some point $S_{m11}$ would be emerging from the $m_{11}^{th}$ light fiber or "delay line" which, in the case of the embodiment of FIG. 4, might comprise light fiber or pipe 38.

The resultant "signal" emitted from the multiple delay or storage means 26 would, in the case of a static sampler 22, comprise a confusing "mixture" of flashes, each individual signal simultaneously emitted from respective light pipes representing the intensity of the incident light pulse at different points along its spatially distributed waveform.

Accordingly, when utilizing a static sampler 22, a sequencing distributor means 28 must be provided so as to effectively "switch" the response of detector 14 from one delay line exit to another in proper sequence and timing. In the inventive embodiment depicted in FIG. 4, a preferred form of such a sequencing distributor means 28 is illustrated as comprising a disc mounted on a shaft 42 for rotation by an electrical motor 44. The disc or sequencing distributor 28 may have one or more notches or holes 46 provided therein such that the output of only one light pipe 34 through 40 at a time can pass therethrough towards the detector 14. As depicted in the drawing, the rotating disc 28 is in a momentary position such as to allow the output from light fiber 34 to impinge upon the detector 14 along path 48.

As should be appreciated, many forms of sequencing distributor means can be provided instead of the rotating disc apparatus of FIG. 4. The critical requirement is merely that the output from the various light pipes 34 through 40 must be passed, one at a time, in proper sequence and timing to the detector 14. One example of an alternative embodiment of the sequencing distributor 28 would be a rotating drum having an axis perpendicular to the exit direction of the light bursts or signals from the multiple delay 26. One or more small mirrors would be mounted on the drum such that, at any one time, only the output from one delay element could possibly strike the detector element 14.

It will also be appreciated by those skilled in the art that various other equivalent structures may be utilized for the multiple delay element 26 rather than the plurality of fibers or pipes described. One such equivalent would be a plurality of mirror pairs each spaced from one another and tilted at a different angle with respect to the direction of the incoming light burst 24, 24'... 24'' such that each respective incoming light burst would have to travel a different distance before exit from the delay means 26.

Figure 5:
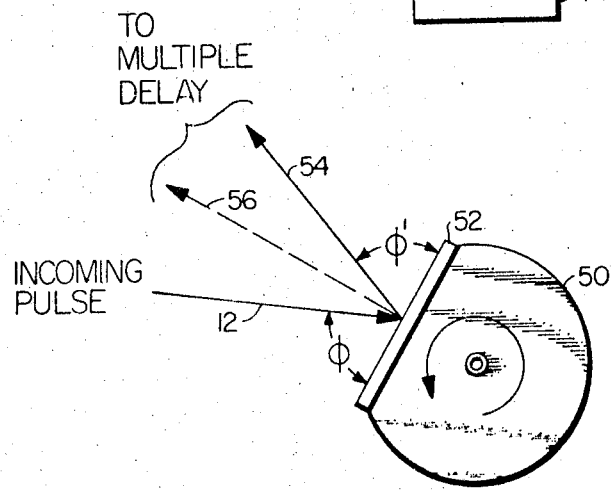
FIG. 5 schematically depicts a further form or embodiment of the instant invention utilizing dynamic sampling techniques.

Further in accordance with the inventive technique, a dynamic sampling element such as depicted in FIG. 5 could be utilized instead of a static sampling unit or means of FIG. 4. One suitable type of dynamic sampling means comprises a rotatable drum 50 having a mirror surface 52 disposed on one portion thereof. When the rotatable drum 50 is in the position depicted in FIG. 5, the incoming light pulse or filament on path 12 would strike the mirror surface 52 at an angle $\Phi$ and would be reflected at an angle $\Phi'=\Phi$ along path 54 towards one spatial location. As the rotating disc or drum 50 continues its motion, further portions of the incoming pulse along path 12 will be reflected from the mirror surface 52 at different angles $\Phi$, and, for example, might take the dotted line path 56 towards a different spatial location. Depending upon the speed of rotation of the drum 50 and further assuming synchronization of the rotation with the generation of the light pulse or filament, the incoming pulse along path 12 will effectively be "segmented" into the plurality of segments M discussed above, each segment of the incoming light pulse or filament being represented by a sequential burst of light along paths 54, 56, etc.

The multiple delay or storage means 26 described in FIG. 4 would still be utilized with the dynamic sampling element of FIG. 5, the input apertures of the multiple delay means being placed in a position so as to receive the respective bursts or flashes of light along directions 54, 56, etc. Of course, since the dynamic sampling technique inherently produces a sequential signal representative of the intensity of the light pulse during a plurality of successive, sequential sampling periods throughout a given time duration, there no longer would be any necessity for the sequencing distributor means 28 of FIG. 4 and the detector element 14 could be placed directly at the output of the multiple delay or storage means 26.

As should be apparent, the output taken directly from the multiple delay or storage means 26 in the case of the dynamic sampling or taken indirectly via the synchronizing distributor in the case of static sampling, comprises a series of optical flashes, spaced in time from one another a sufficient duration so as not to exceed the rise time limitations of the detector 14. Yet, the series of flashes so produced are themselves of extremely short duration and, in some circumstances, it is possible that the detector element 14 would still not respond in a truly linear fashion. Accordingly, the instant invention contemplates the further provision of a means for converting the energy in each individual optical flash into a signal still proportional to the number of photons in the particular sampled segment of the incoming light filament 20 but at a lower power and/or a longer duration than the duration of the optical flash signal itself. One simple, yet highly efficient, technique to effect this result contemplates the placement of a phosphorescent screen (not illustrated) just prior to the detector element 14. The phosphor material itself would be selected in accordance with known principles such that the individual optical flashes would be quickly absorbed and such that the phosphorescent material would have a persistence or decay time on the order of T, the "rise time" of the detector 14.

It should now be apparent that the objects set forth at the outset of this specification have been successfully achieved. Accordingly,

What I claim is:

1. A method of increasing the effective rise time of modulations on a sort duration light pulse whereby detection of the modulations by a detector having a response time longer than the rise time of the modulations is enhanced, said method comprising the steps of sampling the intensity of the short duration light pulse at a plurality of different points along a spatially distributed waveform thereof; generating a separate signal representative of each sampled intensity; storing each separate signal for respectively different time periods of sufficient duration to enable sequential monitoring at a rate within the response time of the detector; and sequentially monitoring each such stored signal.

2. A method of enhancing detection of variations in intensity of a light pulse occurring at a faster rate than the inherent rise time of the detection equipment utilized, said method comprising the steps of sampling the instantaneous intensity of a spatially distributed light pulse during a plurality of successive, sequential periods; generating a signal during each sampling period representative of the instantaneous intensity of the light pulse; storing each generated signal for respectively different lengths of time of predetermined durations sufficient to enable sequential monitoring at a rate within the inherent rise time of the detection system; and sequentially monitoring each such stored signal.